(12) United States Patent
Scruggs et al.

(10) Patent No.: US 8,941,264 B2
(45) Date of Patent: Jan. 27, 2015

(54) APPARATUS FOR BI-DIRECTIONAL POWER SWITCHING IN LOW VOLTAGE VEHICLE POWER DISTRIBUTION SYSTEMS

(75) Inventors: Michael K. Scruggs, Pompton Plains, NJ (US); Serdar T. Sozusen, Pinebrook, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 802 days.

(21) Appl. No.: 13/134,901

(22) Filed: Jun. 20, 2011

(65) Prior Publication Data

US 2012/0319483 A1 Dec. 20, 2012

(51) Int. Cl.
- *H02J 1/10* (2006.01)
- *B60R 16/033* (2006.01)
- *H02J 7/34* (2006.01)
- *H02J 1/00* (2006.01)

(52) U.S. Cl.
CPC . *H02J 1/10* (2013.01); *H02J 1/108* (2013.01); *B60R 16/033* (2013.01); *H02J 7/34* (2013.01); *H02J 2001/008* (2013.01)
USPC .......................................................... 307/52

(58) Field of Classification Search
CPC .................................. H02J 1/10; H02J 1/108
USPC ................................................................ 307/52
See application file for complete search history.

(56) References Cited

U.S. PATENT DOCUMENTS

| | | | | |
|---|---|---|---|---|
| 3,529,210 | A | * | 9/1970 | Wada Yuichi et al. ........... 361/58 |
| 5,028,499 | A | * | 7/1991 | Pearce et al. .................... 429/61 |
| 5,223,351 | A | * | 6/1993 | Wruck .............................. 429/9 |
| 5,488,283 | A | * | 1/1996 | Dougherty et al. .......... 307/10.1 |
| 5,536,977 | A | * | 7/1996 | Williams ......................... 307/43 |
| 5,598,041 | A | * | 1/1997 | Willis .............................. 307/43 |
| 5,619,127 | A | * | 4/1997 | Warizaya ...................... 323/275 |
| 5,656,915 | A | * | 8/1997 | Eaves ............................. 320/118 |
| 5,717,310 | A | * | 2/1998 | Sakai et al. ................... 307/10.1 |
| 5,726,505 | A | * | 3/1998 | Yamada et al. ............... 307/127 |
| 5,764,032 | A | * | 6/1998 | Moore .......................... 320/126 |
| 5,801,937 | A | * | 9/1998 | Gold et al. .................... 363/141 |
| 5,867,007 | A | * | 2/1999 | Kim .............................. 320/118 |
| 5,883,484 | A | * | 3/1999 | Akao ............................ 318/700 |
| 6,130,813 | A | * | 10/2000 | Kates et al. .................. 361/93.1 |

(Continued)

FOREIGN PATENT DOCUMENTS

| | | |
|---|---|---|
| EP | 1946956 | 7/2008 |
| EP | 2154028 | 2/2010 |

(Continued)

*Primary Examiner* — Adi Amrany
(74) *Attorney, Agent, or Firm* — Daniel J. Long

(57) ABSTRACT

A plurality of modules each including at least a pair of series connected power MOSFETs are configured between a plurality of DC voltage sources, and a plurality output terminals for connection to respective loads, are controlled for selectively applying power to the loads via time delay switching incorporating forward biased intrinsic diodes of the MOSFETs in a given current path during initial application of power to a load, whereby a predetermined period of time after turning on one of the series connected MOSFETs, the associated other MOSFET is turned on to shunt its intrinsic diode for reducing the resistance in the current path to maximize current flow. The configuration of the plurality of power MOSFETs is also controlled for selectively providing bi-directional current flow between said plurality of DC voltage sources.

16 Claims, 4 Drawing Sheets

(56) References Cited

U.S. PATENT DOCUMENTS

| | | | |
|---|---|---|---|
| 6,198,252 B1* | 3/2001 | Mukainakano | 320/128 |
| 6,222,346 B1* | 4/2001 | Mori | 320/134 |
| 6,271,642 B1* | 8/2001 | Dougherty et al. | 320/104 |
| 6,275,958 B1* | 8/2001 | Carpenter et al. | 714/48 |
| 6,320,358 B2* | 11/2001 | Miller | 323/222 |
| 6,538,864 B2* | 3/2003 | Mullner | 361/58 |
| 6,717,388 B2* | 4/2004 | Smidt et al. | 323/271 |
| 6,891,425 B1* | 5/2005 | Huynh | 327/427 |
| 6,957,048 B2* | 10/2005 | Formenti | 455/90.1 |
| 7,202,631 B2* | 4/2007 | Breen et al. | 320/132 |
| 7,336,002 B2* | 2/2008 | Kato et al. | 307/10.6 |
| 7,368,829 B2* | 5/2008 | Tezuka | 307/9.1 |
| 7,466,573 B2* | 12/2008 | Kojori et al. | 363/65 |
| 7,642,750 B2* | 1/2010 | Liu et al. | 320/127 |
| 7,671,490 B2* | 3/2010 | Hartung et al. | 307/115 |
| 7,724,487 B2* | 5/2010 | Dishman et al. | 361/82 |
| 8,004,109 B2* | 8/2011 | Komatsu | 307/9.1 |
| 8,044,639 B2* | 10/2011 | Tamegai et al. | 320/138 |
| 8,076,797 B2* | 12/2011 | Kramer et al. | 307/52 |
| 8,253,277 B2* | 8/2012 | Lin et al. | 307/86 |
| 8,316,984 B2* | 11/2012 | Tanaka et al. | 180/443 |
| 8,467,212 B2* | 6/2013 | Mino et al. | 363/127 |
| 8,614,865 B2* | 12/2013 | Andresen et al. | 361/3 |
| 8,630,078 B2* | 1/2014 | Chai et al. | 361/93.9 |
| 8,810,199 B2* | 8/2014 | Roeper | 320/116 |
| 2005/0012689 A1* | 1/2005 | Abdoulin | 345/60 |
| 2005/0189981 A1* | 9/2005 | Matsunaga | 327/436 |
| 2006/0238945 A1* | 10/2006 | Werback et al. | 361/93.1 |
| 2007/0090799 A1* | 4/2007 | Lee et al. | 320/118 |
| 2007/0091528 A1* | 4/2007 | Yamashita | 361/93.1 |
| 2007/0188140 A1* | 8/2007 | Chen | 320/128 |
| 2009/0051337 A1* | 2/2009 | Yoshida et al. | 323/283 |
| 2009/0058500 A1* | 3/2009 | Osawa et al. | 327/434 |
| 2009/0112384 A1* | 4/2009 | Jeon et al. | 701/22 |
| 2011/0080760 A1* | 4/2011 | Lu | 363/127 |
| 2011/0115451 A1* | 5/2011 | Hashimoto et al. | 323/272 |
| 2011/0203869 A1* | 8/2011 | Tanaka et al. | 180/443 |
| 2011/0210746 A1* | 9/2011 | Yugou et al. | 324/427 |
| 2012/0025768 A1* | 2/2012 | Nakano et al. | 320/116 |
| 2012/0153899 A1* | 6/2012 | Marschalkowski et al. | 320/118 |
| 2012/0286733 A1* | 11/2012 | Chang et al. | 320/118 |
| 2013/0193906 A1* | 8/2013 | Yu | 320/103 |
| 2014/0049222 A1* | 2/2014 | Moorhead et al. | 320/134 |

FOREIGN PATENT DOCUMENTS

| | | | | |
|---|---|---|---|---|
| JP | 09205740 A | * | 8/1997 | H02J 9/06 |
| WO | 01-86735 | | 11/2001 | |
| WO | 03-057536 | | 7/2003 | |

* cited by examiner

US 8,941,264 B2

APPARATUS FOR BI-DIRECTIONAL POWER SWITCHING IN LOW VOLTAGE VEHICLE POWER DISTRIBUTION SYSTEMS

STATEMENT OF GOVERNMENT INTEREST

The invention was made with U.S. Government support under Contract No. W56 HZV-07-C-0095 awarded by U.S. Army Tank Automotive Command (TACOM).

FIELD OF THE INVENTION

The present invention relates generally to power distribution systems, and more particularly to low voltage high current switching control systems for connecting different DC power sources to one or more loads, particularly as used in vehicle power management systems but not limited thereto.

BACKGROUND OF THE INVENTION

In known high current low voltage DC power distribution systems, such as those used in military ground and aerial vehicles, for example (but not limited thereto), a combination of electromechanical relays, contactors, circuit breakers and/or fuses, are employed to selectively distribute power to an associated vehicle's electrical devices or loads. The various electrical components of the vehicle system are protected through use of the fuses and/or circuit breakers. The power generating devices, and storage batteries employed in such vehicles are selectively switched into connection with the various system components via the use of electromechanical relays and/or contactors, which in certain systems may provide bi-directional power control. However, such electromechanical switching devices present reliability problems due to mechanical wear, arching between relay contacts, deterioration from vibration, and moisture exposure. Also, the mechanical contacts of electromechanical relays and/or contactors tend to bounce when activated or deactivated, thereby generating high amplitude electrical noise in the associated system. Also, in systems powering reactive loads that tend to draw high inrush currents when electrically activated, abrupt electrical relay contact closures for providing power to such devices typically results in power surges. In addition, such prior systems typically require a large amount of power to be applied to the electromechanical relays and contactors, in order to insure the maintenance of high mechanical pressure between associated electrical contacts for minimizing contact resistance. Also, the use in the prior systems of manually operated switches and circuit breakers forces a layout, such as in vehicles, that provides easy accessibility to such manually operated components.

There is a present need in the state of art for high current low DC voltage power distribution systems having bi-directional power control capability with improved reliability, and automonous and remote operational capability. The present invention provides a major improvement in enhancing the reliability of high current low DC voltage power distribution systems employing bi-directional power control.

SUMMARY OF THE INVENTION

An object of the invention is to provide an improved high current low DC voltage power distribution system.

Another object of the invention is to provide a solid-state high current low DC voltage power distribution system requiring low power operation, and offering high reliability, negligible electrical noise upon switching, bi-directional power control, and the ability to limit the magnitude of inrush currents when applying power to reactive loads.

With these and other objects in mind, the present invention, in one embodiment, includes a plurality of pairs of series connected power MOSFETs modules arranged in a modified symmetrical "phase leg" switching configuration. The MOSFET arrangement is not application specific and in this embodiment has at least three inputs and at least one output to a common bus or load. In application the inputs connect between power sources such as batteries and/or generators and devices or loads to be powered by the system, whereby individual control signals are selectively provided to the gates of the individual ones of the plurality of pairs of MOSFETs, via programmable control means, for in one mode of operation providing initially reduced current flow to a load through use of forward biased intrinsic diodes of the MOSFETs, followed by turn on of an appropriate one of the MOSFETs associated with the intrinsic diode(s) to provide increased current to an associated load from a selected source of power. In a preferred arrangement, for each successive two of the plurality of pairs of series connected power MOSFETs, an output MOSFET of one pair is connected in parallel to an output MOSFET of the following pair to reduce or minimize power dissipation and current path resistances.

In another embodiment of the invention, in a first mode of operation a plurality of MOSFETs are configured for selective connection of at least one or a combination of a primary battery, secondary battery, and motor driven generator for connection to an internal bus, and therefrom to at least one device or load requiring the selective application of DC power. The control system has means to tie any of the inputs to the MOSFET array together (i.e. primary and secondary batteries busses can be connected together to provide backup capability in the event of a battery failure.) In this mode, a controller means is programmed to sense when the voltage output of the primary battery is higher than that of the secondary battery, for initially turning on a selected first MOSFET of a given series connected pair thereof, for permitting current to flow from the primary battery through the turned on or activated MOSFET, and through the forward biased intrinsic diode of a second MOSFET of another pair thereof, into the secondary battery, and after a delay time, the second MOSFET is turned on for minimizing the resistance in the current path between the primary and secondary batteries to maximize the current flow from the primary battery to the secondary battery. In a second mode of operation, when the controller means senses that the voltage level of the secondary battery is greater than that of the primary battery, the controller means is operable for turning on the second MOSFET for permitting the current to flow from the secondary battery through the intrinsic diode of the first power MOSFET into the primary battery, and after a time delay to turn on the first MOSFET for maximizing the current flow from the secondary battery to the primary battery. In a third mode of operation when the generator is operable for providing DC power, the controller means includes means for sensing such generator operation, and first operating a selected third MOSFET for permitting charging current to flow from the generator through an intrinsic diode of a fourth MOSFET, and into the primary battery, whereby after a time delay the fourth MOSFET is turned on to minimize the resistance in the current path between the generator and primary battery to maximize the charging current flow therebetween. In a fourth mode of operation, the controller means is operable for turning on a fifth MOSFET to permit current to flow from the generator through the intrinsic diode of a sixth MOSFET to provide a flow of current from the generator to the secondary battery, and after a predetermined time delay to turn on the sixth MOSFET transistor for maximizing the charging current flow from the generator to the secondary battery. The purpose of these modes is to provide a smooth power transition by first establishing a current path via closing a first MOSFET switch of a series connected pair whose intrinsic diode opposes current flow to allow the diode of the associated second MOSFET switch to conduct, thus establishing a current path. Once established, the second MOSFET switch is turned on to reduce the connection path power dissipation. The reverse diode of the first MOSFET is required to block current to break the connections in the event one wishes to turn the system OFF or if there is an over current condition.

A relatively low voltage high current power distribution system includes nine pairs of MOSFETs connected between an internal bus and at least a primary battery, secondary battery, and motor driven generator, and between the internal bus and at least one load or component requiring power. Controller means including means for sensing the level of voltage output from the primary and secondary batteries, and from the generator, whereby the controller means is programmed to selectively operate the nine pairs of MOSFETs in a plurality of modes of operation. In the first mode of operation, when the primary battery voltage level is higher than the secondary battery voltage level, a selected first MOSFET having a reverse biased intrinsic diode is turned on for providing a current path from the primary battery through the main current path of the first MOSFET, and through the relatively higher resistance of a forward intrinsic biased diode of a second MOSFET to the secondary battery, whereafter a desired time delay, the second MOSFET is turned on for reducing the resistance in the current path to maximize the flow of current from the primary battery to the secondary battery. In the second mode of operation, when the voltage level of the secondary battery is greater than that of the primary battery, the second MOSFET is turned on to establish a current path from the secondary battery through the intrinsic reverse diode of the first MOSFET through the primary battery, and after a desired time delay the first MOSFET is turned on for minimizing the resistance between the first MOSFET and the primary battery to maximize the current flow from the secondary battery to the primary battery. In a third mode of operation the controller means upon sensing operation of the generator, selectively turns on a third MOSFET for permitting charging current to flow from the generator through the low resistance main current path of the third MOSFET, and the intrinsic reverse diode of a fourth MOSFET to the primary battery, and after a desired time delay the fourth MOSFET is turned on to minimize the resistance in the current path for maximizing the flow of charging current from the generator to the primary battery. In a fourth mode of operation, when the generator operation is sensed, the controller means is selectively operable for turning on a fifth MOSFET to establish a current path from the generator through an intrinsic reverse diode of a sixth MOSFET to the secondary battery for charging thereof, and after a desired time delay, the controller means turns on the sixth MOSFET for minimizing the resistance in the current path to maximize the flow of charging current from the generator to the secondary battery. In a fifth mode of operation, upon the controller means sensing operation of the generator, the controller means is selectively operable for turning on a seventh MOSFET to establish a current path from the generator through the intrinsic diodes of eighth and ninth MOSFETs to the internal bus, whereafter a tenth MOSFET is turned on for connecting a load to the internal bus, causing an initial low magnitude of current to flow from the generator to the load, followed by a time delay period after which the eighth and ninth MOSFETs are turned on for minimizing the resistance in the current path, thereby maximizing the magnitude of current flowing from the generator to the load. In a sixth mode of operation, an eleventh MOSFET is turned on for establishing a current path from the primary battery through the intrinsic diodes of twelfth and thirteenth MOSFET transistors and the main current path of the eleventh MOSFET, whereafter a fourteenth MOSFET is turned on for connecting the internal bus to a second load, to supply a relatively low magnitude of current thereto, and after a predetermined time delay the twelfth and thirteenth MOSFETs are turned on for minimizing the resistance in the current path and maximizing the magnitude of current flow from the primary battery to the second load. In a seventh mode of operation, a controller means is operable for turning on a fifteenth MOSFET to establish a current path from the second battery through the intrinsic diodes of sixteenth and seventeenth MOSFETs and the main current path of the fifteenth MOSFET to the internal bus, whereafter an eighteenth MOSFET is turned on to connect the internal bus to a third load, thereby permitting a relatively low magnitude of current to flow from the secondary battery to the third load. After a predetermined time delay period the sixteenth and seventeenth MOSFETs are turned on for minimizing the resistance in the current path to maximize the magnitude of current flowing from the secondary battery to the third load. In other modes of operation, the controller means is operable for turning on any desired combination of the tenth, fourteenth, and eighteenth MOSFETs, for connecting any combination of the first through third loads to the internal bus. In yet other modes of operation, the controller means is operable for establishing current paths for connecting any combination of the generator, primary battery, and secondary battery to the internal bus for selectively providing power to any combination of the first through third loads, and for selectively connecting the generator to either one or both of the primary and secondary batteries for charging the same, while at the same time utilizing the generator to provide power to the various loads. The MOSFET configuration can be extended within practical limits to include additional batteries, and/or generators, and to provide power to more than three loads therefrom.

DETAILED DESCRIPTION OF THE INVENTION

Figure 1:
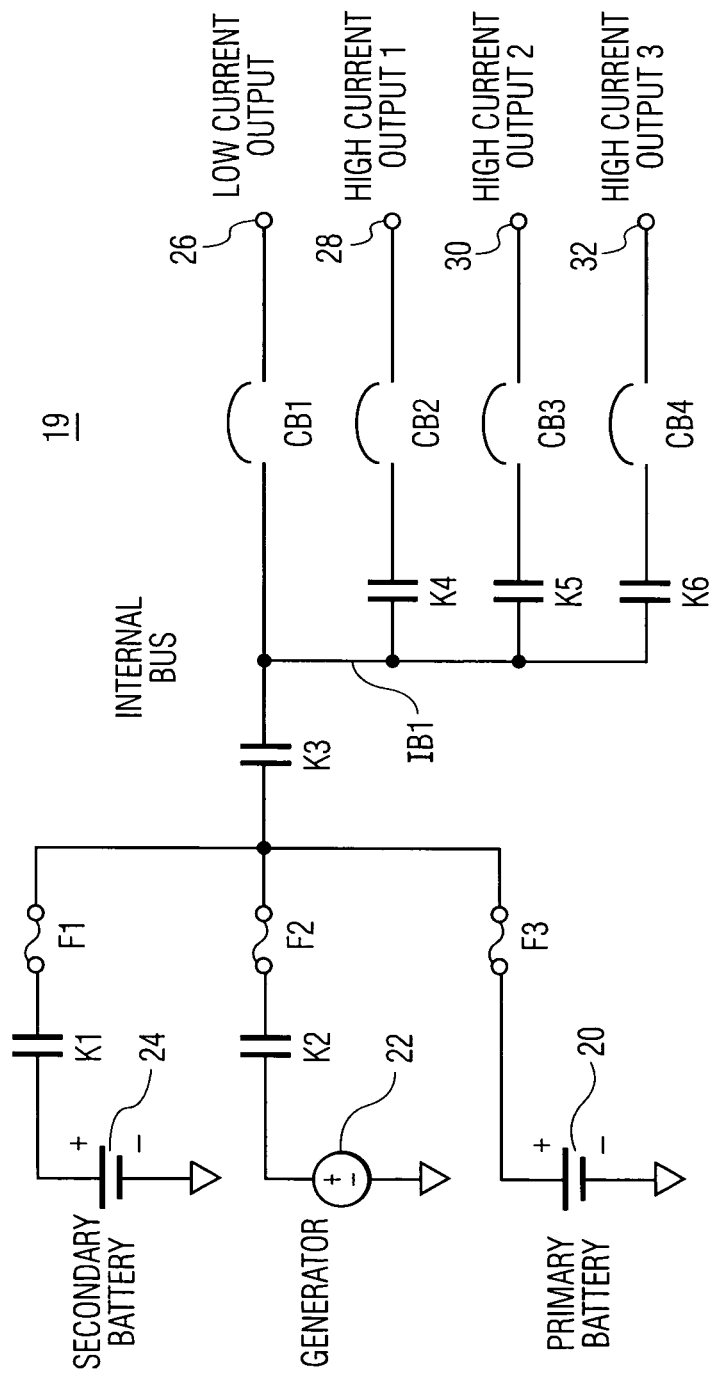
FIG. 1 is a schematic diagram of a prior power distribution system.

In typical vehicle electrical systems, a generator/battery set is used for electrical power. With the advent of sophisticated electronic equipment, the need for clean un-interruptible power has become necessary to operate electronics found on many Military ground and air platforms. In such systems requiring "clean" power, it is often required to have a primary electrical system to operate the normal vehicle loads (i.e. vehicle starter, windshield wipers, lights, heaters, etc.) and a secondary battery (as a minimum) or generator—battery set to provide power for momentary power dropouts. A typical prior power distribution system 19 is shown in FIG. 1, and consists of three DC power sources 20, 22, 24 that are routed to an internal bus IB1, and then to individual outputs 26, 28, 30, 32 for load distribution. In this example, three DC power sources are shown (although the concept can be reduced or expanded to any number desired), and include one motor driven DC generator 22, one primary battery 20, and one secondary or backup battery 24. The power system outputs are represented as high current outputs 28, 30, 32, respectively, and a low current output 26, for providing power to the vehicle system electrical loads.

The prior power distribution system 19 of FIG. 1 has two possible modes of operation which will now be described. Each operating mode corresponds to typical vehicle power systems. Note that these are the most common applications, and the approach can be adapted to other specific applications.

In Mode 1 operation, the primary battery 20 provides continuous power to the internal bus IB1 and corresponding vehicle loads (not shown). Operation of the vehicle engine (not shown) energizes the DC generator 22 and allows it to provide power to the internal bus IB1, and system loads connected to output terminals 26, 28, 30, 32, respectively, while charging the primary battery 20. In Mode 1, the secondary battery 24 serves as a reserve and can be connected if necessary (i.e. primary battery 20 failure). This type of system is commonly used in large vehicles with two (or more) electrical systems.

Mode 2 operation is indicative of the type of electrical systems found in smaller vehicles, and consists of one generator 22, a primary battery 20, and secondary battery 24. In this system, the generator 22 operates all vehicle loads and charges both the primary and secondary batteries 20, 24. The secondary battery 24 is switched to the internal bus IB1, and keeps it powered when the voltage drops on the primary electrical system during drop outs or outages.

In both mode 1 and mode 2 power system operational modes described above, it is apparent that power must be able to flow from the generator 22 bi-directionally to each battery 20, 24, and to various loads, to facilitate power delivery and charging. The system must also be able to block power to maintain necessary isolation between the power sources, and prevent pull downs of the internal bus IB1.

As previously indicated, prior known power distribution systems are for implementing low voltage power architectures similar to those described above, and utilizes a combination of electromechanical relays, contactors, fuses, and switches or circuit breakers, such as shown in FIG. 1.

With further reference to the prior power distribution system 19 shown in FIG. 1, typical operation of this system will now be described. Whenever power contactor K3 is closed or energized, the primary battery 20 is connected to the internal bus IB1. Typically, military type vehicles utilize 28 volts DC power systems, although other levels of DC voltage may be used. In this example, assume that with power contactor K3 energized, and circuit breaker CB1 closed; the engine of the associated vehicle can then be started, whereafter DC generator 22 is driven by the motor. After the motor is started, power contactor K2 is energized utilizing the output power from the generator to both provide necessary power to the vehicle, while at the same time charging the primary battery 20. Depending upon the vehicle's power requirements at any given time, in this example, power contactor K4 is energized along with closure of circuit breaker CB2 to provide power to a load connected to output terminal 28; power contactor K5 is energized along with closure of circuit breaker CB3 to provide power to a load connected to output terminal 30; and power contactor K6 is energized along with closure of circuit breaker CB4 to apply power to a load connected to output terminal 32. If excessive currency is drawn from primary battery 20, fuse F3 will open to protect the battery from overload. Similarly, should excess power be drawn from the generator 22, fuse F2 will open to protect the generator 22. In the event of failure of the primary battery 20, power contact K1 is energized to insert secondary battery 24 into the system and onto the internal bus IB1. Also, at times that a sensor (not shown) senses that the voltage of the secondary battery 24 drops below a desired level, the contactor K1 can be energized to permit the generator 22 to charge the secondary battery 24 back up to the desired voltage level, whereafter power contactor K1 is opened or de-energized.

Although the prior power distribution system 19 of FIG. 1 provides power control, it has several disadvantages. The operation of power contactors K1 through K6 typically require a significant amount of power for operation. This is necessary to maintain high pressure on the conductor contact surfaces to minimize contact resistance. The components are mechanical in nature and are subject to mechanical wear, contaminants, moisture and vibration and electrical arcing. The abrupt switching of the contacts generates noise from contact bounce and from current transients as the sudden current switching excites the cable reactance in the system. The use of high current circuit breakers CB1, through CB3 and fuses F1, F2, F3 also require manual intervention in the case of a system fault. Several improvements have been made in the art by replacing the circuit breaker/contactor output pairs (CB2, K4) with solid-state relays using power MOSFETS, transistors or IGBTs. While this approach is proven and eliminates some of the problems associated with the electromechanical components, most devices in the present art for low voltage power distribution are unidirectional (i.e. power source to load) and are not capable of handling high currents. Many known components are optimized for high voltage distribution and create too much voltage drop and power dissipation for use in low voltage DC systems.

Figure 2:
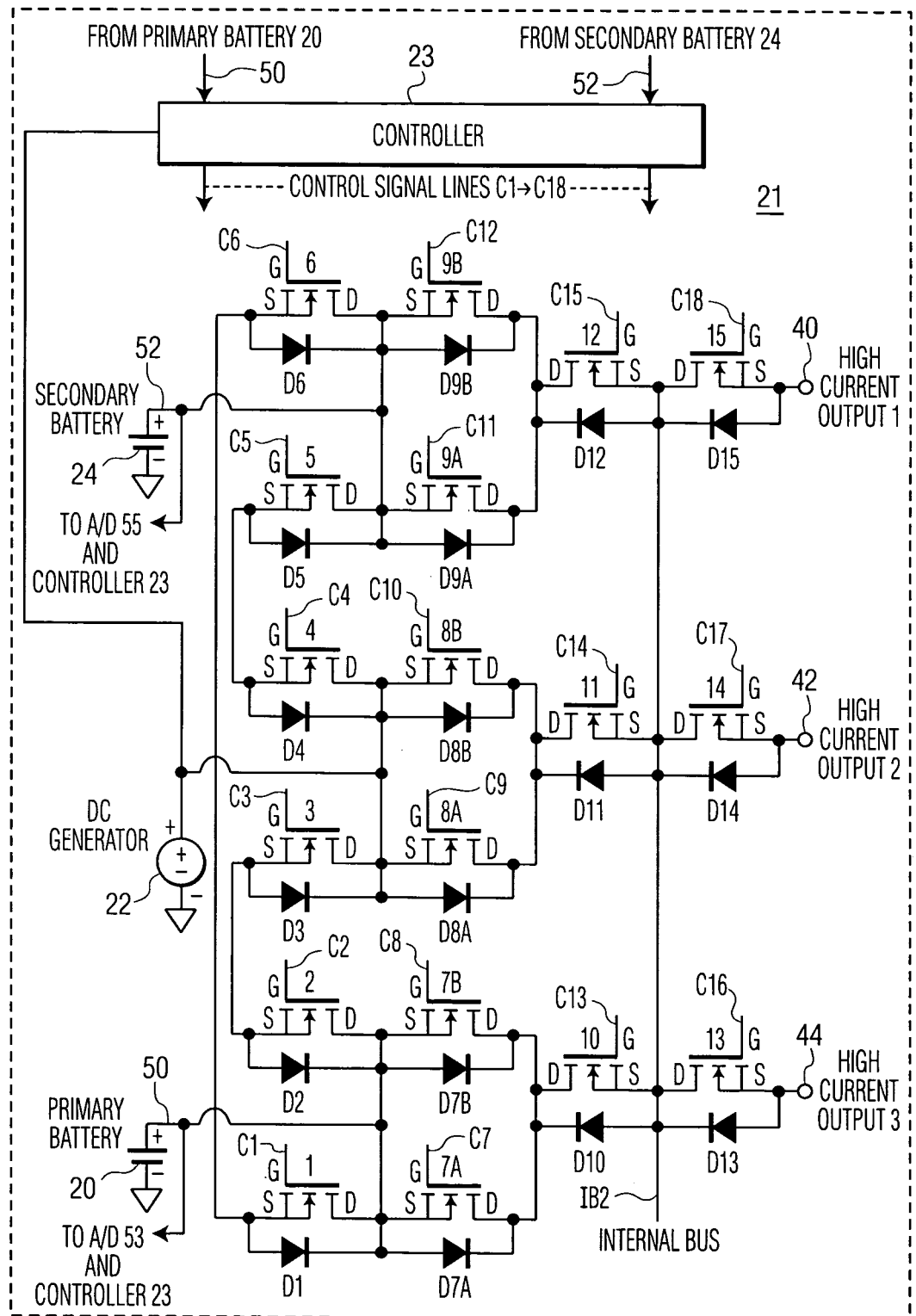
FIG. 2 is a block and circuit schematic diagram for one embodiment of the invention.

The inventors conceived a low voltage high current DC power control and distribution system, primarily for vehicle power distribution, that includes a power MOSFET array or matrix for providing high power switching, and bi-directional power control between DC sources of power, along with unidirectional high current control of power outputs to various loads. The DC power sources particularly include batteries, and motor driven generators. FIG. 2 shows a DC power distribution system 21 that includes a number of embodiments of the present invention that will be described in further detail below. It should be noted that although the DC distribution or power control system 21 is shown to include as DC power sources a primary battery 20, a motor driven DC generator 22, and a secondary battery 24, each being configured along with the switching network to at different times provide power to three loads connected to output terminals 40, 42, and 44, respectively, it is not meant that the system be so limited, and can be expanded to include additional DC power sources, and accommodate more than three loads or devices requiring DC power. Expansion of the present DC power control system 21 is limited only by practical considerations within the present state-of-the-art.

With further reference to the DC power control and distribution system 21 of FIG. 2, in a preferred embodiment for a low voltage high current application the power MOSFET matrix includes a plurality of dual power Trench MOSFET modules 1, 7A; 2, 7B; 3, 8A; 4, 8B; 5, 9A; 6, 9B; 10, 13; 11, 14; and 12, 15. However, the invention is not meant to be limited to Trench MOSFET devices, whereby any power MOSFET having an intrinsic source drain body diode that can handle a given application's power requirements can be used for the various embodiments of the invention. Also included is a controller 23. To facilitate the understanding of the operation of the present system 21, the intrinsic reverse diodes or source-drain body diodes for each of the MOSFET devices are also shown. These source-drain body diodes include D1 through D6, D7A through D9A, D7B through D9B, and D12 through D15. Note that the aforesaid diodes are indicative of the direction of blocking current flow when their associated MOSFET is turned off. As will be further explained, in order to implement a bi-directional switching capability, each power path of the matrix of MOSFETs of system 21 includes back-to-back diodes. The inventors further recognized in conceiving the present invention that each of the aforesaid power MOSFETs are operable in three modes, the first being a non-conductive mode, a second being a mode where current flows through an associated source-drain body diode, and a third mode responsive to a gate signal for turning on the MOSFET to provide a low resistance connection between the associated source drain connections thereof, shunting the associated body diode. In one application of the present invention, the aforesaid dual power Trench MOSFET modules were provided by VMM 1500-0075X2 modules, manufactured by IXYS Corporation (Milpitas, Calif. 95035). Each such IXYS dual power MOSFET module includes a pair of series connected Trench MOSFETs, each of which is rated at 75 volts, 1500 amps, and each has when conductive a drain-source resistance of 0.38 milliohms. The present inventors chose this component in view of its compatibility with 28 volts vehicle systems, and the requirement that the system 21 be capable of handling at least 500 amp currents. However, as previously mentioned, this choice of component is not meant to be limiting, for the present invention can be realized using other individual power MOSFETs, and power MOSFET packages having different voltage and current ratings. It should be further noted that this choice of component for the particular requirements of one application for the DC power distribution system 21 provided an extremely compact switching array having minimal space or volume requirements, providing via each of the associated MOSFET switches a very low voltage drop, low power dissipation, and high current operation. Note further that each of the selected dual power MOSFET modules include three pairs of Trench MOSFETs, each pair of Trench MOSFETs being connected in pairs relative to their channels, whereby only such module is necessary for providing pairs of MOSFETS 10 through 15, as shown in FIG. 2, for example. As indicated, the present inventors chose to use time delay switching in the switching matrix having 100 millesecond delays, but such delay is not meant to be limiting. Also, in one embodiment the controller 23 includes a field-programmable gate array (FPGA) programmed to provide control signals through use of included analog circuitry, logic networks, analog-to-digital converters, and so forth.

Operation of the power distribution and control system 21 will now be described. Note that in FIG. 2 the gate, source, and drain connections for each of the MOSFETs shown are designated by S, D, and G, respectively. Also the controller 23 provides control signal lines C1 through C18 for connection to the gates of the aforesaid MOSFETs, 1 through 6, 7A, 7B, 8A, 8B, 9A, 9B, and 10 through 15, respectively. Controller 23 causes control lines C1 through C6 to go high to turn on MOSFETs 1 through 6, respectively; C7 through C12 to go high to turn on MOSFETs 7A, 7B, 8A, 8B, and 9A, 9B, respectively; and C13 through C18 to go high to turn on MOSFETs 10 through 15, respectively. The primary battery 20, secondary battery 24, and DC generator 22 are connected to controller 23, as shown. Note also in this application, reference designations C1 through C18 are used to designate either a control signal line, or an associated control signal with the same designation, which when "high" turns on its associated MOSFET. In a first embodiment of the invention, the primary battery 20 is initially connected in a relatively high resistance current path via diodes D7A, D7B of MOSFETs 7A, 7B, respectively, to the drain of MOSFET 10, whereby when controller 23 provides a gate signal C13 to the gate of MOSFET 10, the latter is turned on or energized to provide a relatively low resistance current path for connecting the primary battery to internal bus IB2. Note that the forward bias resistance of all of the aforesaid source-drain body diodes of the IXYS MOSFETs is typically dependent on the magnitude of current, and is typically less than 2.5 milliohms for the aforesaid IXYS Trench MOSFETs. After MOSFET switch 10 is turned on, either simultaneous with such turn on or after predetermined phase-lag or time delay (100 ms, for example), control signals C7, and C8 can be applied to the gates of MOSFET switches 7A, 7B, respectively, for connecting their energized channel resistances in parallel to minimize the resistance of the current path from primary battery 20 to the internal bus IB2 (the parallel channel resistances will total about 0.19 milliohms when using the aforesaid IXYS Trench MOSFETs). Such action completes a low resistance current path from primary battery 20 to the internal bus IB2, whereby the total resistance of this current path will be the sum of the series channel resistances of MOSFETs 7A, 7B and 10, or about 0.57 milliohms. Note further that if control signal C16 is present, MOSFET 13 will be turned on to apply the primary battery 20 to a load connected to output terminal 44. Note further that where required, time delay switching can be utilized to first allow current to pass through the intrinsic diode D7B, followed by turning on MOSFET 7B at a predetermined time later, such as 100 milleseconds later, for example, for shunting diode D7B with the low resistance channel thereof in an energized state.

The MOSFET switches 13 through 15 are configured to act as output switches, for controlling the application of power to loads connected to output terminals 44, 42, and 40, respectively, the DC power being provided from the internal bus IB2. The MOSFET switches 10 through 12 are configured to be analogous to main circuit breakers, whereby controller 23 is operative to terminate control signals C13, C14, and/or C15, in the event of overload current or excessive current flowing through MOSFETs 10 through 12, respectively, to the internal bus IB2. Such control is provided either individually or in some combination in accordance with the operation of MOSFETs 10 through 12, at any given time. Note that when MOSFETs 10 through 12 are turned off, their associated intrinsic diodes D10 through D12, respectively, block the flow of current from primary battery 20, DC generator 22, and secondary battery 24, respectively to the internal bus IB2. Similarly, when the output MOSFET switches 13 through 15 are turned off, their associated intrinsic diodes D13, D14, and D15, respectively, block the flow of current from the internal bus IB2 to output terminals 44, 42, and 40, respectively.

When system 21 is employed for providing power to a vehicle, typically the primary battery 20 with at least MOSFETs 7A, 7B, and 10 turned on, the vehicle engine is started. The engine (not shown) then operates DC generator 22 for providing DC power to the vehicle systems and recharging the primary and/or secondary batteries 20, 24, respectively, as required, and as will be explained in further detail. Typically, the DC generator 22 when energized has a higher DC output voltage than batteries 20, 24, respectively, whereby if this condition is not true at any given time, a sensing circuit (not shown) will disconnect the generator and switch to battery operation.

Upon operation of the DC generator 22, the controller 23 is operative for turning on the aforesaid MOSFET switches in many different combinations, depending upon the vehicle requirements, and sensed operating conditions at any given time. For example, the magnitude of current flowing through any current path to a load can be monitored via a current sensor, such as a Hall-effect sensor (not shown) for programming the controller 23 to turn off any operative one of MOSFETs 10 through 12, in the event of an overload condition, as previously mentioned. With the DC generator 22 operative, controller 23 can be programmed to apply control signal C14 to MOSFET 11 to turn it on, while initially retaining MOSFETs 8A and 8B de-energized, whereby a relatively low magnitude of current can flow from DC generator 22 through the intrinsic diodes D8A and D8B, and through the channel or main current path of MOSFET 11 to the internal bus IB2. Controller 23 can be programmed to after a time delay of 100 milleseconds from the time of turning on MOSFET 11, for example, to apply control signals C9 to the gate of MOSFET 8A, and C10 to the gate of MOSFET 8B, to turn them on, for minimizing the current path resistance between the DC generator 22 and the internal bus IB2. With the generator connected to the internal bus IB2, controller 23 can be programmed to apply control signals C16 through C18, to the gates of MOSFET switches 13 through 15, respectively, in any desired combination for powering loads connected to output terminals 44, 42, and 40, respectively.

When the DC generator 22 is operative for providing power to the internal bus IB2, as previously indicated, controller 23 can be programmed to turn on MOSFETs 7A, 7B, and 10 for charging primary battery 20 from the DC generator 22 via internal bus IB2. Alternatively, for a more direct charging path, MOSFET switches 2 and 3 can be turned on, with 7A and 7B turned off, for charging primary battery 20 from DC generator 22.

Note further that in the switching matrix configuration of system 21, for one embodiment of invention, MOSFET switches 7A and 7B, 8A and 8B, and 9A and 9B are individually or in any combination respectively turned on together or turned off together, and are thereby operative as individual MOSFET switch pairs, respectively. As described for MOSFET 7A and 7B, when each aforesaid pair are turned on their respective channels are connected or parallel thereby minimizing the associated current path resistance.

When controller 23 senses that the primary battery 20 has a voltage level below a predetermined operating level, MOSFETs 7A, 7B, and 10 are turned off, and MOSFETs 9A, 9B, and 12 are turned on, for connecting the secondary battery 24 to the internal bus IB2. In operating with the primary battery 20, time delay switching can be utilized, whereby first MOSFET switch 12 is turned on with MOSFET switches 9A and 9B turned off, whereby a relatively high resistance current path will be established from secondary battery 24, through the intrinsic diodes D9A and D9B, and the channel of MOSFET 12 to the internal bus IB2, whereby 100 milleseconds later (in this example), controller 23 operates to turn on MOSFET switches 9A and 9B, for minimizing the resistance of the current path between the secondary battery 24 and internal bus IB2.

Figure 3:
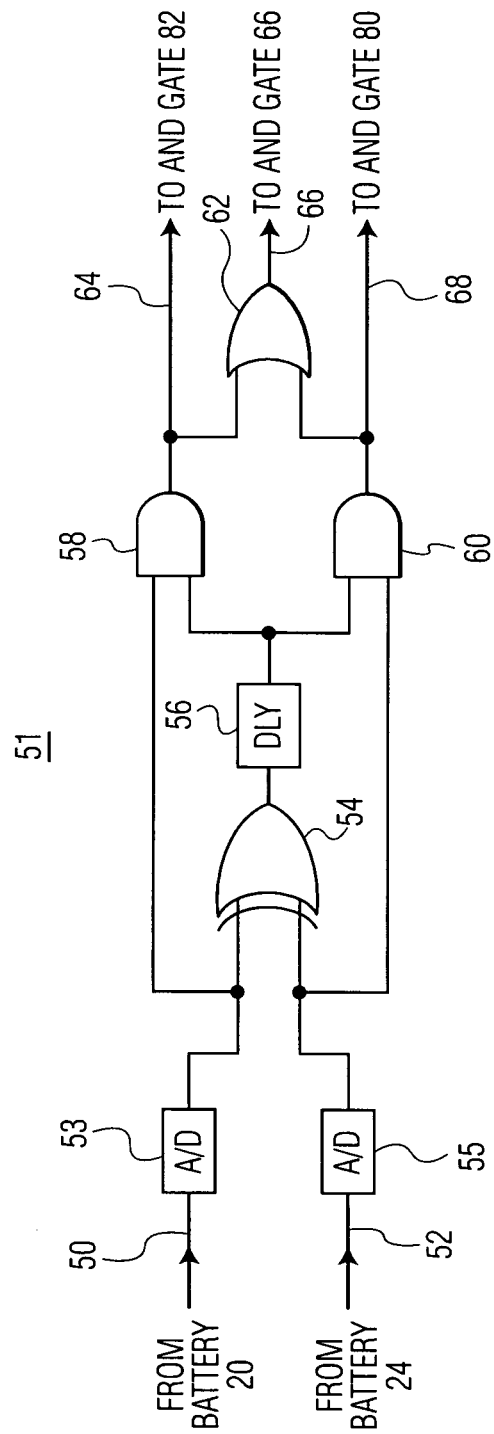
FIG. 3 is a logic network for comparing the voltage level of batteries for another embodiment of the invention.

The MOSFET switching matrix of system 21 is operable via a controller 23 for providing bi-directional current control between primary battery 20, and secondary battery 24, as immediately described. As previously mentioned, in the prior art connection between the primary and secondary batteries 20, 24, respectively, is typically provided by closure of electromechanical contactors or relay contacts, whereby the direction of current flow is dependent on the level of the battery voltages of the system at the time of contact closure. Such abrupt circuit connection typically results in high inrush currents, and electrical noise produced from the electromechanical contacts. As will be explained, the present invention overcomes these problems by first sensing the relative levels of voltage of the primary battery 20 and secondary battery 24 before any connection therebetween, and directly controlling MOSFET switches 1 and 6 of system 21 in a manner that provides for current flow between the batteries to be first minimized by flow-through associated intrinsic diodes, followed by maximizing the current flow through turn on of the MOSFET associated with the forward biased intrinsic diode to minimize the resistance in the current path therebetween. More specifically, in this example, the logic network of FIG. 3 is built into controller 23 for comparing the voltage levels of primary battery 20 and secondary battery 52 at any given time. The logic network 51 operates by supplying the voltage levels of primary 20 and secondary battery 24 via A/D converters 53,55, respectively, to individual inputs of a XOR (Exclusive OR) gate 54. The primary voltage level from A/D 53 is also applied to an input of an AND gate 58, with the secondary voltage level also being applied from A/D 55 to an individual input of another AND gate 60. The output of XOR gate 54 is applied through a delay logic 56 to individual inputs of AND gate 58 and 60. When the output of AND gate 58 is high, and that of AND gate 60 is low on signal lines 64, 68, respectively, the secondary voltage level is less than the primary voltage level. When the output of AND gate 60 is high on signal line 68, and low signal line 64, this is indicative of the secondary voltage being greater than the primary voltage level. When the output signals from And gate 58 and AND gate 60 are each low, the low signals being applied as inputs to OR gate 62, the latter operates to apply a high signal on signal line 66 indicating that the primary voltage level is equal to the secondary voltage level.

Figure 4:
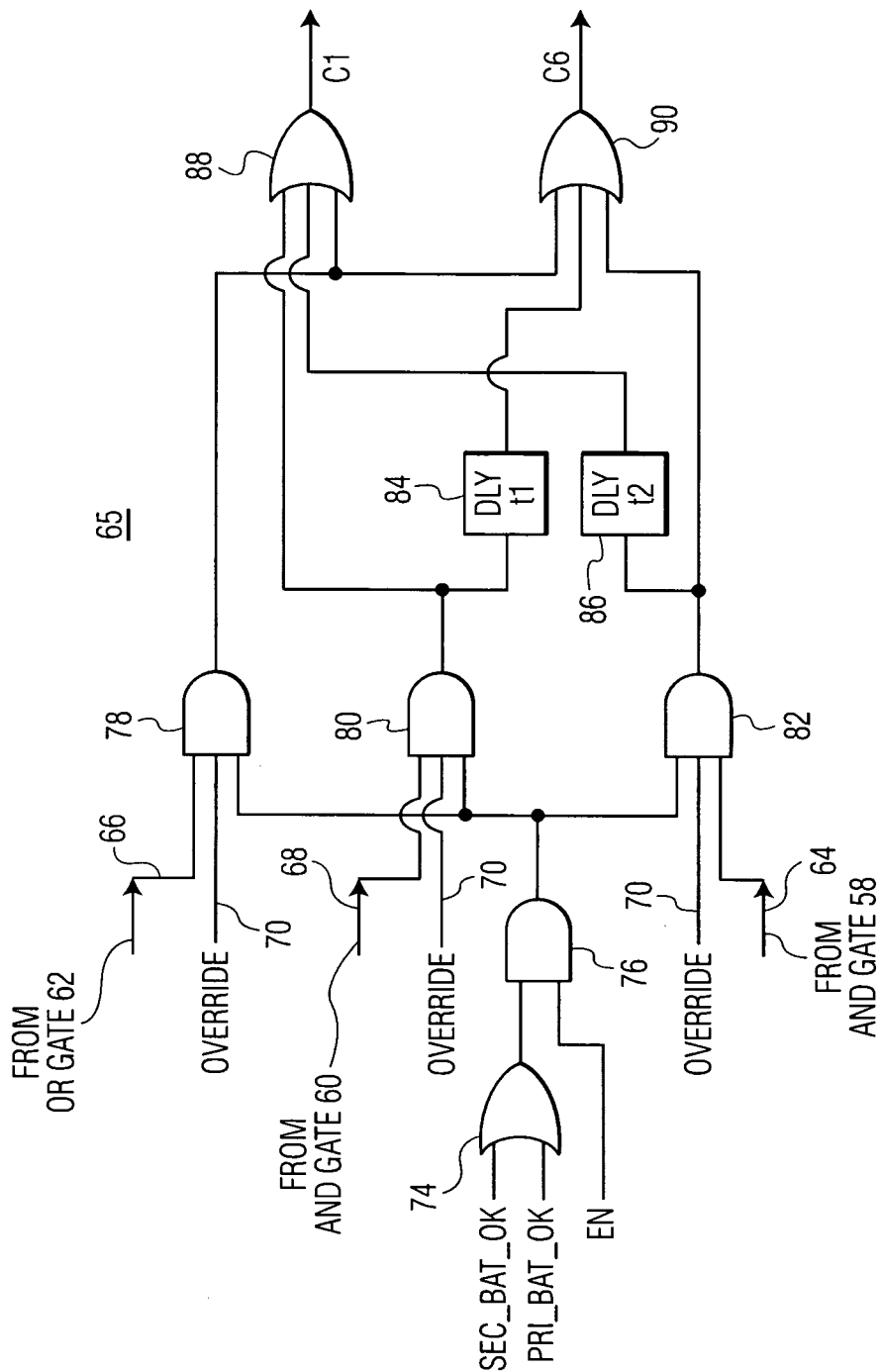
FIG. 4 is a logic diagram of a switching control network for yet another embodiment of the invention.

The controller 23 further includes a control logic network 65 as shown in FIG. 4, for controlling the sequence of turn-on of MOSFETs 1 and 6, as will be described. As shown in FIG. 4, the logic network 65 includes an OR gate 74 receiving individual digital input signals from sensing circuitry (not shown) indicative of the voltage level of the primary battery 20 and secondary battery 52 having at least one at an operational level, with the output from OR gate 74 being applied to an individual input of an AND gate 76. An enable EN signal is applied to the other input of AND gate 76, the output of which goes high upon receiving high input signals. The output of AND gate 76 is connected to individual inputs of AND gates 78, 80, and 82. AND gate 78 also has individual inputs connected to the output line 66 of OR gate 62, and an override line 70. And gate 80 also has individual inputs connected to the output line 68 from AND gate 60, and an override signal line 70. AND gate 82 also has individual inputs connected to an override line 70, and to output line 64 from AND gate 58 of logic 51. The output of AND gate 78 is connected to individual inputs of OR gates 88 and 90, respectively. The output of AND gate 80 is connected directly to an independent input of OR gate 88, and through a delay 84 to an independent input of OR gate 90. AND gate 82 is connected directly to an independent input of OR gate 90, and through a delay 86 to an independent input of OR gate 88. When the output of OR gate 88 is high, control line C1 goes high for turning on MOSFET 1 of system 21, and when the output of OR gate 90 is high, control line C6 goes high for turning on MOSFET 6 of system 21. More specifically, at times that it is necessary to connect primary battery 20 to secondary battery 24, when their voltage levels are equal, the logic networks 51 and 65 of FIGS. 3 and 4, respectively, cause MOSFET switches 1 and 6 to turn on simultaneously for directly connecting the batteries 20, 24 to one another via a minimum resistance current path. When it is sensed that the level of the voltage for the primary battery 20 is higher than that of the secondary battery 24, control signal line C1 goes high, with control signal line C6 low, for turning on MOSFET switch 1, thereby connecting primary battery 20 through the low resistance channel or main current path of energized MOSFET 1, and the intrinsic diode D6 of MOSFET 6 to secondary battery 24, thereby initially establishing a relatively high resistance current path therebetween. After a predetermined delay period, 100 milleseconds in this example, control signal line C6 from the output of OR gate 90 will go high for turning on MOSFET 6, for establishing a relatively low resistance path between batteries 20 and 24. Yet in another mode of operation, when the level of voltage of the secondary battery 24 is greater than that of the primary battery 20, logic networks 51 and 65 are operative for causing the output line C6 of OR gate 90 to go high for turning on MOSFET switch 6, for connecting the secondary battery 24 through the low resistance main current path of MOSFET 6, and the relatively high resistance of intrinsic diode D1 of MOSFET 1, to the primary battery 20, whereby after a delay period of 100 milleseconds, in this example, the output of OR gate 88 goes high for causing signal line C1 to go high to turn on MOSFET switch 1, for establishing a substantially low resistance current path between batteries 20 and 24. In this manner, bi-directional current flow can be provided between batteries 20 and 24, depending upon the voltage levels of each at the switching time.

Table 1, as shown below, is illustrative of examples of six modes of operation of system 21, namely Modes I through VI, for DC voltage source to output switching.

TABLE 1

| Mode | Step | Pri. Batt. 20 | Sec. Batt. 24 | Gen. 22 | Condition | MOSFETs Switching/Operation State And Control Line State dly = time delay ~0.1 sec | | | | | |
|---|---|---|---|---|---|---|---|---|---|---|---|
| I | a | Active | N/A | Off | Pri. Batt. 20 to Int. Bus. IB2 | 10 (ON) | dly | 7A, 7B (ON) | dly | | |
| | b | Active | N/A | Off | Int. Bus. IB2 to Outputs 40, 42, 44 | 13 (ON) | dly | 14 (ON) | dly | 15 (ON) | |
| II | a | N/A | Active | OFF | Sec. Batt. 52 to Int. Bus. IB2 | 12 (ON) | dly | 9A, 9B (ON) | | | |
| | b | N/A | Active | OFF | Int. Bus. IB2 to Outputs 40, 42, 44 | 13 (ON) | dly | 14 (ON) | dly | 15 (ON) | |
| III | a | N/A | N/A | Active | Gen. 22 Actively to Int. Bus. IB2 | 11 (ON) | dly | 8A, 8B (ON) | | | |
| | b | N/A | N/A | Active | Int. Bus. IB2 to Outputs 40, 42, 44 | 13 (ON) | dly | 14 (ON) | dly | 15 (ON) | |
| IV | a | Active | N/A | OFF | Pri. Batt. 20 to bus prior to start | 10 (ON) | dly | 7A, 7B (ON) | dly | | |
| | b | Active | N/A | Active | Gen. 22 Start/Gen 22 To Bus. IB 2 | 11 (ON) | dly | 10 (OFF) | dly | 8A, 8B | |
| | c | Active | N/A | Active | Gen. 22 to charge Pri. Batt. 20 | 3 (ON) | dly | 2 (ON) | dly | | |
| | d | Active | N/A | Active | Int. Bus. IB2 to Outputs 40, 42, 44 | 13 (ON) | dly | 14 (ON) | dly | 15 (ON) | |
| V | a | N/A | Active | OFF | Sec. Batt. 52 to bus prior to start | 12 (ON) | dly | 9A, 9B (ON) | dly | | |
| | b | N/A | Active | Active | Gen. 22 Start/Gen 22 To Bus. IB 2 | 11 (ON) | dly | 12 (OFF) | dly | 8A, 8B | |
| | c | N/A | Active | Active | Gen. 22 charge Sec. Batt. 52 | 4 (ON) | dly | 5 (ON) | dly | | |
| | d | N/A | Active | Active | Int. Bus. IB2 to Outputs 40, 42, 44 | 13 (ON) | dly | 14 (ON) | dly | 15 (ON) | |
| VI | a | Active | Active | OFF | Pri. Batt. 20 to bus prior to start | 10 (ON) | dly | 7A, 7B (ON) | dly | | |
| | b | Active | Active | Active | Gen. 22 Start/Gen 22 To Bus. IB 2 | 11 (ON) | dly | 7A, B (OFF) | dly | 8A, 8B | |
| | c | Active | Active | Active | Gen. 22 charge Pri. Batt. 20 | 3 (ON) | dly | 2 (ON) | dly | | |
| | d | Active | Active | Active | Gen. 22 charge Sec. Batt. 52 | 4 (ON) | dly | 5 (ON) | dly | | |
| | e | Active | Active | Active | Int. Bus. IB2 to Outputs 40, 42, 44 | 13 (ON) | dly | 14 (ON) | dly | 15 (ON) | |

Table 2, as shown below, illustrates operational Modes VII through IX for primary battery 20 to secondary battery 24 connections.

TABLE 2

| Mode | Step | Pri. Batt. 20 | Sec. Batt. 24 | Gen. 22 | Battery Voltage Levels | MOSFETs Turned On | | |
|---|---|---|---|---|---|---|---|---|
| VII | a | Active | Active | N/A | Pri. Batt. 20 > Sec. Batt. 52 | 1 | dly | 6 |
| | b | Active | Active | N/A | Pri. Batt. 20 to Int. Bus. IB2 | 10 | dly | 7A, 7B |

TABLE 2-continued

| Mode | Step | Pri. Batt. 20 | Sec. Batt. 24 | Gen. 22 | Battery Voltage Levels | MOSFETs Turned On | | MOSFETs Turned On |
|---|---|---|---|---|---|---|---|---|
| VIII | a | Active | Active | N/A | Pri. Batt. 20 < Sec. Batt. 52 | 6 | dly | 1 |
|  | b | Active | Active | N/A | Pri. Batt. 20 to Int. Bus. IB2 | 10 | dly | 7A, 7B |
| IX | a | Active | Active | N/A | Pri. Batt. 20 = Sec. Batt. 52 | 6,1 | dly | dly |
|  | b | Active | Active | N/A | Pri. Batt. 20 to Int. Bus. IB2 | 10 | dly | 7A, 7B |

Note that Tables 1 and 2 do not show all possible switching modes, other of which are believed apparent from the above description of operation. Further note that in Tables 1 and 2 the sequence steps for each mode are from left to right starting at "a," proceeding to the end, then starting at "b" to the end, and so forth.

From the description of operation given above, it has been shown that the low voltage high power distribution system 21 is operative for providing switching with minimized electrical noise development compared to prior electrical mechanical switching systems. Also, the present invention provides for substantially reducing high magnitude inrush currents when delivering power to various DC loads, or interconnecting battery power sources of the system together, for establishment of current paths that initially include the resistance of an intrinsic diode or pair of intrinsic diodes in a desired current path, followed by a predetermined delay for turning on associated MOSFET switches to minimize the resistance in the current path for maximizing the magnitude of current flow therethrough.

Although various embodiments of the present invention have been described in detail above, they are not meant to be limiting. Those of skill in the art may recognize certain modifications to the embodiments taught herein which modifications are meant to be covered by the spirit and scope of the appended claims. For example, the switching system of FIG. 2 can be expanded to include any number of DC sources of power, and any number of loads or output terminals to a practical limit.

What is claimed is:

1. A low voltage high current DC power distribution system comprising:
a first DC voltage source being a primary battery;
a second DC voltage source being a secondary battery;
switching means connected between said primary and secondary batteries;
controller means operable in a first mode in response to said primary battery voltage level being greater then said secondary battery voltage level, for controlling said switching means to allow said primary battery to charge said secondary battery;
said controller means being operable in a second mode in response to said secondary battery voltage level being greater than said primary voltage level, for controlling said switching means to allow said secondary battery to charge said primary battery; and
said controller means being further operable to control the timing of said switching means in said first and second modes to prevent inrush current from flowing into the one of said primary battery and secondary battery being charged.

2. The system of claim 1, further including:
at least a first power MOSFET switch including a first intrinsic diode, a gate electrode, a source electrode connected to said first DC voltage source, and a drain electrode, said first intrinsic diode having an anode and cathode connected between the source and drain electrodes, respectively;
a first output terminal for connection to a first load;
an internal bus coupled to the drain of said first power MOSFET;
at least a second power MOSFET switch having a gate electrode, a drain electrode connected to said internal bus, and a source electrode connected to said first output terminal; and
said controller means being operable for first applying a control signal to the gate of said second power MOSFET to turn it on for connecting said bus to said output terminal via a relatively low resistance current path between the former's drain and source electrodes, whereby a relatively high resistance current path is provided from said first DC voltage source, through said first intrinsic diode to the drain electrode of said second power MOSFET, to limit the initial magnitude of current flowing from said first DC voltage source to a load; and
said controller means including means for applying a control signal to the gate electrode of said first power MOSFET a predetermined time after turn on of said second power MOSFET, for turning on said first power MOSFET switch to substantially reduce the resistance between its source and drain electrodes, thereby substantially reducing the relative resistance in the current path between said first DC voltage source and said first output terminal.

3. The system of claim 2, wherein said controller includes a Field-Programmable Gate Array (FPGA).

4. The system of claim 2, further including:
a third power MOSFET switch connected in parallel with said first power MOSFET switch, whereby an intrinsic diode of said third power MOSFET in parallel with the intrinsic diode of said first power MOSFET switch reduces the initial resistance in that portion of the current path in half;
said controller means being operable for simultaneously applying control signals to gate electrodes of said first and third power MOSFET switches to turn on a predetermined time after time on of said second power MOSFET switch, thereby reducing by one-half the resistance of the portion of the current path between source and drain electrodes of said first and third MOSFET switches relative to the first MOSFET switch alone, and providing for the first and third MOSFET switches to each share about one-half of the magnitude of current flowing from said first DC voltage source to said first output terminal at any time.

5. The system of claim 4, further including:
a fourth power MOSFET switch having a gate electrode, a source electrode connected to said second DC voltage source, a drain electrode coupled to said internal bus, and an intrinsic diode having an cathode electrode connected to said drain electrode;

said controller means further including means for initially establishing a relatively high resistance current flow path from said second DC voltage source to a load coupled to said internal bus, and after a predetermined time delay applying a control signal to the gate of said fourth power MOSFET switch for turning it on to substantially reduce the resistance in the current flow path between said second DC voltage source and a load.

6. The system of claim 5, wherein said controller includes logic means for sensing and comparing the voltage levels of said first and second DC voltage sources.

7. The system of claim 5, further including:
a fifth power MOSFET switch having a gate electrode, and source and drain electrodes connected to the source and drain electrodes, respectively, of said fourth power MOSFET switch, thereby connecting said fourth and fifth power MOSFET switches in parallel for at any time sharing current flow through that portion of the current path they mutually represent; and
said controller means being operative for simultaneously turning on or off said fourth and fifth power MOSFETs.

8. The system of claim 7, further including:
a third DC voltage source; and
a sixth power MOSFET switch having a source electrode connected to said third DC voltage source, a gate electrode for receiving a control signal, a drain electrode coupled to said internal bus, and an intrinsic diode having anode and cathode electrodes formed between its source and drain electrodes, respectively;
said controller means being operable a predetermined time after current flows from said third DC voltage through the relatively high resistance forward biased intrinsic diode of said sixth power MOSFET to a load coupled to said internal bus, for applying a control signal to the gate of said sixth power MOSFET to turn it on for substantially reducing the relative resistance between its source and drain electrodes.

9. The system of claim 8, further including:
a seventh power MOSFET switch connected in parallel with said sixth MOSFET switch with source and drain electrodes, respectively, connected in common, and having a gate electrode; and
said controller means being operable for simultaneously turning on and off said sixth and seventh power MOSFETs.

10. The system of claim 8, further including:
eighth and ninth power MOSFET switches having source electrodes connected together, and independent gate electrodes, said eighth MOSFET switch having a drain electrode connected in common to the source electrode of said first power MOSFET switch and to said first DC voltage source;
said third DC voltage source being a DC generator; and
said controller means being operable for applying control signals to the gate electrodes of said eighth and ninth power MOSFET switches to turn them on for connecting said generator to said first DC voltage source to charge it.

11. The system of claim 10, further including:
tenth and eleventh power MOSFET switches having source electrodes connected together, and independent gate electrodes, said tenth power MOSFET having a drain electrode connected in common to the source electrode of said seventh MOSFET switch and said third DC voltage source, said eleventh power MOSFET switch having a drain electrode connected in common to the source electrode of said fifth power MOSFET switch and said second DC voltage source serving as a secondary battery; and
said controller being operable to apply control signals to the gate electrodes of said tenth and eleventh power MOSFET switches to turn them on to connect said DC generator to said second DC voltage source to charge it.

12. The system of claim 11, wherein said switching means includes:
twelfth and thirteenth power MOSFET switches each having source electrodes connected in common, each having a gate electrode, said eleventh power MOSFET switch having a drain electrode connected to said primary battery, said thirteenth power MOSFET having a drain electrode connected to said secondary battery;
said controller means being operable in said first mode in response to said primary battery voltage level being greater then said secondary battery voltage level, for applying a control signal to the gate of said twelfth power MOSFET switch for turning it on to initially establish a current path from said primary battery, through the relatively low resistance drain to source current path of said eleventh power MOSFET switch, the relatively high resistance forward biased intrinsic diode of said twelfth power MOSFET switch, to said secondary battery, and a predetermined time after turning on said twelfth power MOSFET switch, apply a control signal to the gate of said thirteenth power MOSFET to turn it on for substantially reducing the resistance between its source and drain electrodes; and
said controller being operable in said second mode in response to said secondary battery voltage level being greater than said primary voltage level, for applying a control signal to the gate of said thirteenth power MOSFET to turn it on to initially establish a current path from said secondary battery, through the relatively low resistance drain to source current path of said twelfth power MOSFET, the relatively high resistance forward biased intrinsic diode of said eleventh power MOSFET switch to said primary battery, and a predetermined time after turning on said thirteenth power MOSFET switch, apply a control signal to the gate of said twelfth power MOSFET to turn it on for substantially reducing the resistance between its source and drain electrodes.

13. The system of claim 12, further including:
fourteenth, fifteenth, and sixteenth power MOSFET switches each having a source electrode connected to said internal bus, each having an independent gate electrode, said fourteenth power MOSFET switch further having a drain electrode connected in common to the drain electrodes of said first and third power MOSFET switches, said fifteenth power MOSFET switch further having a drain electrode connected in common to the drain electrodes of said sixth an seventh power MOSFET switches, and said sixteenth power MOSFET switch having a drain electrode connected in common to the drain electrodes of said fourth and fifth power MOSFET switches; and
said controller means being operable for upon start up of said system applying control signals to the gate electrodes of said fourteenth, fifteenth, and sixteenth power MOSFET switches for turning them on, and for turning any one or more of these switches off in the event of an associated overload condition.

14. The system of claim 13, further including:
said second power MOSFET switch having its drain electrode directly connected to the source electrode of said fourteenth power MOSFET switch;
second and third output terminals for connection to second and third loads, respectively;
a seventeenth power MOSFET switch having a drain electrode directly connected to the source electrode of said sixteenth power MOSFET switch, a gate electrode for receiving a control signal, and a source electrode connected to said second output terminal; and
an eighteenth power MOSFET switch having a drain electrode directly connected to the source electrode of said sixteenth power MOSFET switch;
said controller being selectively operable to apply control signals to the gates of said second, seventeenth, and eighteenth power MOSFET switches for selectively connecting said first through third output terminals to said internal bus.

15. The system of claim 14, wherein said first through eighteenth power MOSFET switches are provided from no greater than nine modules, each module including at least two series connected MOSFETs.

16. The system of claim 8, wherein said third source of DC voltage is a motor driven DC generator.

* * * * *